Nov. 12, 1957  G. SIMONIAN  2,812,748
ROTARY INTERNAL COMBUSTION ENGINE
Filed Oct. 17, 1955  3 Sheets-Sheet 1

INVENTOR:
Goorgen Simonian,
BY
Beau, Brooke, Buckley & Beau,
ATTORNEYS.

Nov. 12, 1957 G. SIMONIAN 2,812,748
ROTARY INTERNAL COMBUSTION ENGINE
Filed Oct. 17, 1955 3 Sheets-Sheet 2

INVENTOR:
Goorgen Simonian,
BY
Beau, Brooks, Buckley & Beau,
ATTORNEYS.

Nov. 12, 1957  G. SIMONIAN  2,812,748
ROTARY INTERNAL COMBUSTION ENGINE
Filed Oct. 17, 1955  3 Sheets-Sheet 3

INVENTOR.
Georgen Simonian,
BY
Beau, Brooks, Buckley & Beau.
ATTORNEYS.

United States Patent Office

2,812,748
Patented Nov. 12, 1957

2,812,748

ROTARY INTERNAL COMBUSTION ENGINE

Goorgen Simonian, Brantford, Ontario, Canada

Application October 17, 1955, Serial No. 540,782

10 Claims. (Cl. 123—16)

This invention relates to internal combustion engines of the rotary type.

Heretofore various rotary type internal combustion engines have been proposed in endeavors to take advantage of certain known theoretical benefits and desirabilities of such engines as compared with reciprocating piston type internal combustion engines. Reference is had here more particularly to rotary type internal combustion engines wherein the force of the exploding and expanding gases is directed against radial vanes or similar force receiving members, what may be referred to as positive displacement type rotary engines, as distinguished from turbine or turbo-jet types of combustion engines.

In vane type rotary internal combustion engines the vexatious balancing problems and the vibration due to rapidly reciprocating parts which are always present in piston type engines are largely eliminated. Furthermore, a more complete scavenging or clearance of spent exhaust gases can be attained in rotary engines. Nevertheless, the proposals of the prior art have not met with commercial success or acceptance despite the theoretical advantages of engines of this type.

The present invention provides a rotary vane type internal combustion engine which embodies the various known and recognized advantages of engines of this general type and wherein the explosive and expansive forces of the combusion gases are directed against rotor vane means in a novel manner whereby the normally pulsating power impulses are merged in a novel manner and by means of a new apparatus and method whereby the usual peaks and low points of the power curves are compounded and combined so as to give a much smoother and less pulsating overall power curve than has heretofore been feasible.

In the preferred form of the present invention a considerable number of secondary vanes are employed about the rotor and arranged in such a way that the primary explosive forces of a rapid succession of explosions are directed against such multiple secondary vanes, amounting almost to a continuous combustion and expansion, and wherein primary or main vane means are arranged to receive the cumulative expanding gases from the multiple combustion chambers formed by the secondary vanes after initial expansion of the multiple explosive charges. The final more or less continuous expansion of the gases against the primary vane means, superimposed on the multiple explosive force increments against the numerous secondary vanes, results in a nearly continuous power output which approaches the smooth torque curve of an electric motor, for instance.

In the specific form of the present invention shown hereing by way of example a pair of rotary units are provided, each incorporating a rotor mounted eccentrically within a chamber to provide crescent shaped working compartments. Speaking generally, vanes traverse both of these crescent shaped working compartments, in one of which the combufistible mixture is compressed and from which it is delivered to the other compartment where it is ignited and expanded.

While the form of the present invention herein shown and described is a workable practical embodiment thereof for the purposes for which it is intended, it is to be understood that the invention is not limited thereto. The specific embodiments shown in the drawings and described in detail in the following specification is by way of example only and is capable of incorporation in other forms and is susceptible to mechanical change, modification and variation within the scope of the appended claims.

Figure 1:
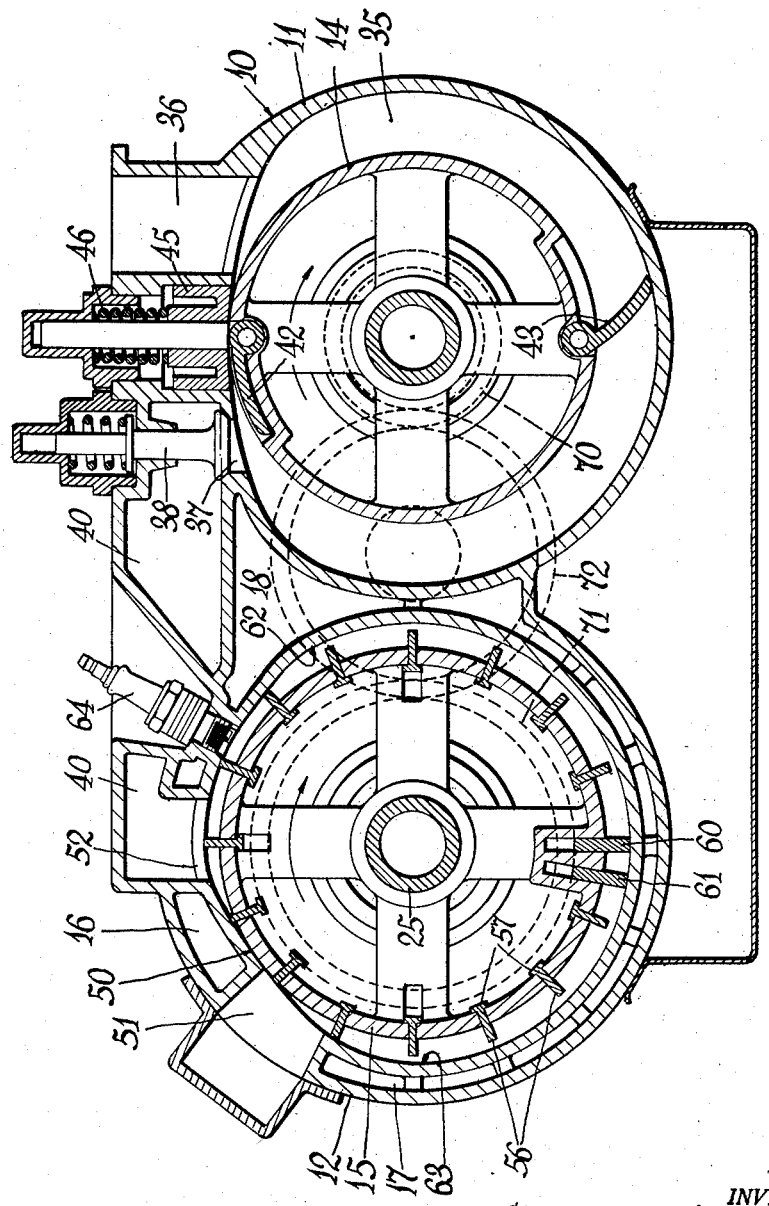
Fig. 1 is a transverse cross-sectional view through one form of the internal combustion engine of the present invention.

Like characters of reference denote like parts in the drawings and the numeral 10 generally designates a main housing member which comprises a pair of side-by-side generally cylindrical casing portions 11 and 12. While of generally cylindrical form the casing portions 11 and 12 have non-circular interior walls, as will presently appear, and cylindrical rotor members 14 and 15 are mounted for rotation in the casing portions 11 and 12, respectively.

The casing portion 11 and its rotor 14 comprise a combustible charge compressing stage and casing portion 12 with its rotor 15 comprises an ignition, combustion and expansion stage. Casing portion 12 is water-jacketed as indicated at 16, 17 and 18 in Fig. 1 and additional water jackets or coolant passages may be provided as required, as for instance at 20 in Fig. 2.

Figure 2:
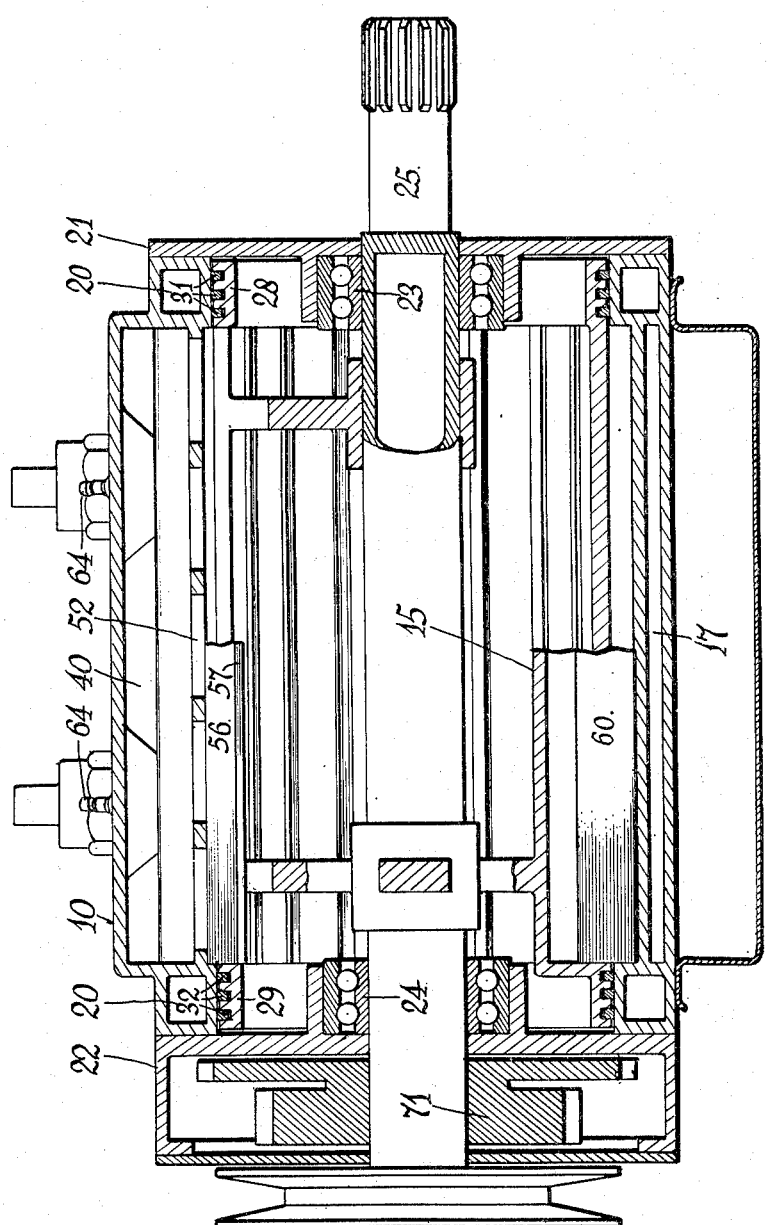
Fig. 2 is a longitudinal cross-sectional view taken axially through the combustion chamber portion of the engine of Fig. 1.

Fig. 2 shows a rotary mounting and end sealing means for the rotor 15 and it is to be understood that similar bearing mountings and sealing means will be provided for rotor 14. Main housing 10 is provided with a pair of end closures 21 and 22 which support anti-friction bearings 23 and 24, respectively, which give rotatable support to a shaft 25 to which rotor 15 is fixed. Circular end portions 28 and 29 of rotor 15 are provided with sealing rings 31 and 32, respectively, which bear in circular end formations in the casing portion 12 of housing 10.

Referring particularly to Fig. 1 casing portion 11 is generally circular in cross-section but is of substantially less radius from the axis of rotor 14 at its upper portion, whereby such upper portion substantially abuts the periphery of rotor 14 to provide a substantially crescent shaped compression chamber 35. An inlet passage 36 leads to chamber 35 to the right of top dead center as viewed in Fig. 1, that is to the right of the abutment just described, and a discharge passage 37 leads from chamber 35 to the left of top dead center. A spring biased poppet valve 38 normally closes passage 37 but pressure thereagainst from chamber 35 opens valve 38 to permit egress of compressed gas to a passage or transfer chamber 40.

A pair of hinged vanes, flappers or abutment members 42 and 43 are carried by rotor 14 and move pivotally inwardly and outwardly in such manner as to maintain sliding contact with the interior surface of casing portion 11 which defines the exterior of chamber 35, the vanes or flappers 42 and 43 being urged outwardly to maintain such contact by centrifugal force during operation of the engine. A gate or abutment block 45 extends along the periphery of rotor 14 parallel to the axis thereof and in sliding engagement therewith and is urged continuously into such engagement by a plurality of spring devices 46 to maintain a fluid seal across the constricted or dividing portion of the chamber 35.

It is believed that the operation of the compression stage is obvious from the foregoing. In the position shown in Fig. 1, vane 43 divides the crescent shaped chamber 35 into intake and discharge portions, the expanding intake portion drawing a combustible gaseous mixture through passage 36, which may be supplied by a carburetor or the like, while previously admitted gaseous mixture is compressed and forced through passage 37 when compressed to a degree sufficient to open valve 38.

Reference will now be had to the left-hand portion of Fig. 1 and the ignition, combustion and expansion portion of the engine of the present invention. The interior wall of casing portion 12, which defines the exterior outline of the combustion and expansion chamber, has a portion of minimum radius, relative to the axis of rotor 15, approximately at the point designated 50 in Fig. 1 at which point such interior wall substantially abuts the exterior periphery of rotor 15 and the combustion and expansion chamber is thus likewise of an approximately crescent shape.

The point of minimum radius of the wall of casing portion 12 immediately follows an exhaust passage 51 and is in turn followed by an intake passage 52 which leads from the chamber 40, which receives the compressed combustible charge from the compression stage.

The periphery of rotor 15 is provided with a plurality of uniformly spaced longitudinal slots which receive radially slidable vane members 56. The vane members 56 have head portions 57 which limit their radial outward movement and the vanes are normally urged outwardly by centrifugal force during operation of the engine. The limited outward movement of vanes 56, which will hereinafter be referred to as secondary vanes, is such that the outer edges of the vanes engage the wall formed by the interior of casing portion 12 during certain portions of their travel but are spaced therefrom at other portions, where the generally crescent shaped chamber is wider in a radial direction.

A pair of primary vane members 60 and 61 are slidably mounted in rotor 15 and are so proportioned as to be in continuous sliding engagement with the outer chamber wall, being urged into such engagement by centrifugal force. In theory a single primary vane 60 may be employed, the additional primary vane 61 being merely to stop and receive pressure from expanding gases which pass primary vane 60. Furthermore, it is within the purview and scope of the invention to employ two diametrically opposite primary vanes.

Figure 3:
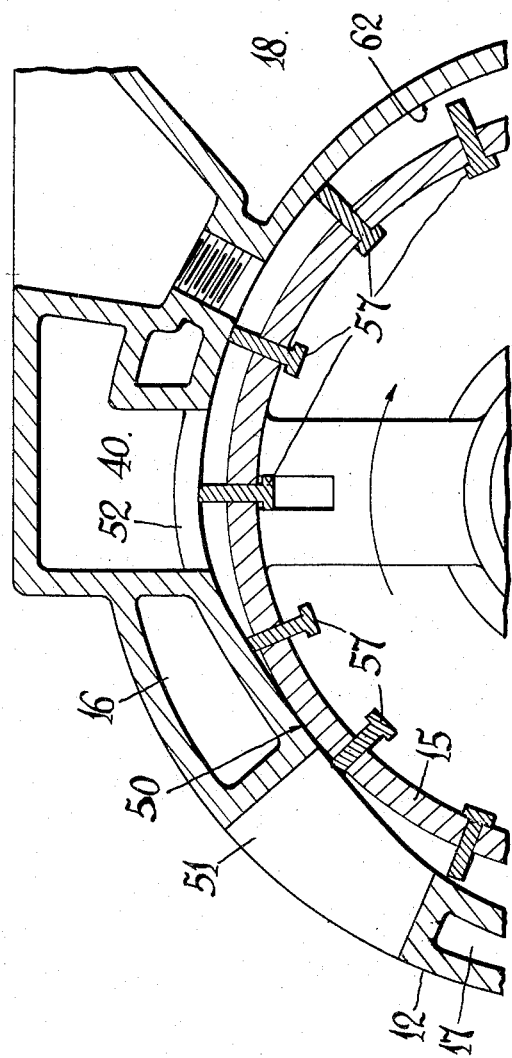
Fig. 3 is a view similar to Fig. 1 but showing the intake portion of the structure on a large scale.

Beginning at the point designated 50 in Figs. 1 and 3, and having particular reference to the latter, the interior wall surface of casing portion 12 increases in radius in a clockwise direction, preferably substantially continuously, to approximately the midpoint of the inlet passage 52. From this point to a point just past the spark plug 64 the radius of the casing wall remains substantially constant and from such point just past spark plug 64 the radius again increases continuously to a point designated 62 in Figs. 1 and 3. From this point the casing wall may extend arcuately and concentrically with respect to the rotor axis in a clockwise direction to approximately the point marked 63 in Figs. 1 and 3, whereupon such wall again decreases gradually in radius to the point 50.

The secondary vanes 56 begin to engage the interior wall of casing portion 12 just before they come to exhaust passage 51 and continue in such engagement until shortly before they reach the point 62. The compressed gaseous mixture which is forced inwardly through inlet passage 52, partly by reason of the compression of the gas in chamber 40 and partly by reason of the inductive action of the expanding space between each pair of vanes 56 at this point, fills the spaces between each pair of secondary vanes 56, and in this way a succession of compressed combustible charges is carried to an ignition point where a continuously operating spark plug 64 ignites each of the charges contained between successive pairs of secondary vanes 56.

Referring to the two vanes 56 which lie at opposite sides of the spark plug 64 in Fig. 1, it will be noted that the right-hand vane of this pair, which is the leading vane of the pair, extends radially outwardly farther than the left-hand or trailing vane, by reason of the increasing radius of the chamber wall. Thus ignition and resultant rapid expansion of the compressed combustible charge between such two vanes produces a differential pressure against the leading vane, because of its greater effective area, causing clockwise rotation of the rotor 15. Each successive increment of combustible charge between a pair of adjacent secondary vanes 56 produces a like torque force or impulse.

After the ignited and partially expanded charge leaves the ignition zone the leading vane 56 thereof leaves the exterior chamber wall, by reason of the contour of the latter, so that the partially expanded charge emerges with the generality of expanding gas lying beyond such point in the chamber and up to the primary vane 60. The accumulation of partially expanded gas continues to expand and exert its cumulative pressure against vane 60 to produce a general clockwise torque on rotor 15.

As the exhaust passage 51 is approached the spent gases are scavenged therethrough, both by the secondary vanes 56 and, finally, by the primary vanes 61 and 60.

It will be seen from the foregoing that the initial high or peak pressure impulses which immediately follow ignition are frequent and closely spaced, by reason of the many secondary vanes, there being fifteen in the present instance, whereas the gases are permitted to expand more completely in their subsequent action against the primary vanes. This produces a much smoother and more highly uniform torque curve than prior art vane type or analogous rotary internal combustion engines and a vastly more uniform torque output curve than can be attained in conventional multicylinder piston type internal combustion engines.

In Fig. 1 the numeral 70 designates a gear fixed to the rotor shaft of the compression rotor 14 and the numeral 71 designates a gear fixed to combustion and expansion rotor shaft 25. An intermediate idler gear is designated 72 and by proper selection of gear ratios virtually any drive ratio may be established between compression rotor 14 and combustion rotor 15. Thus the engine may be proportioned to provide a proper compression ratio for virtually any type of combustible gas or combustible gaseous mixture.

I claim:

1. In an internal combustion engine, a casing having a generally cylindrical interior wall and a rotor mounted eccentrically therein to define a chamber between said members, a primary vane and a multiplicity of secondary vanes projecting radially from said rotor, said primary vane being yieldably urged in continuous sliding engagement with said interior wall and said secondary vanes being yieldably urged radially outwardly toward a limit position wherein they slidably engage said interior wall during a portion of their respective revolutions and are spaced therefrom during another portion, an exhaust passage leading from said chamber in advance of the point where the rotor is closest to said interior wall and a fuel inlet passage in said chamber beyond said point, and ignition means beyond said inlet passage, said secondary vanes engaging said interior wall at said ignition means whereby each successive pair defines a combustion chamber, the radial distance between the rotor and said interior wall gradually increasing in the direction of rotation from said point through the zone of said ignition means and beyond, whereby the leading vane leaves said interior wall after ignition and initial expansion of the charge to merge said charge with previous charges to act against the primary vane for further expansion.

2. In an internal combustion engine, a casing having a generally cylindrical interior wall and a rotor mounted therein to define a generally annular chamber between said members, a primary vane and a multiplicity of secondary vanes projecting radially from said rotor, said primary vane being in continuous sliding engagement with said interior wall and said secondary vanes being in slidable engagement with said interior wall during a portion of their respective revolutions and spaced therefrom during another portion, said interior wall being shaped to form a constriction in said generally annular chamber, an exhaust passage leading from said chamber in advance of said constriction and a fuel inlet passage to said chamber beyond said constriction, and ignition means beyond said inlet passage, said secondary vanes engaging said interior wall at said ignition means whereby each successive pair defines a combustion chamber, the radial distance between the rotor and said interior wall gradually increasing in the direction of rotation at the zone of said ignition means, each secondary vane being adapted to leave said interior wall after ignition and initial expansion of the charge to merge said charge with previous charges to act against the primary vane for further expansion.

3. In an internal combustion engine, a casing member having a generally cylindrical interior wall and a member mounted therein to define a generally annular chamber between said members, one of said members comprising a stator and the other a rotor, a primary vane and a multiplicity of secondary vanes carried by the rotor member and extending radially toward said stator member, said primary vane being in continuous sliding engagement with said stator member and said secondary vanes being in slidable engagement with said stator member during a portion of their respective revolutions and spaced therefrom during another portion, said annular chamber having a constriction therein, an exhaust passage leading from said chamber in advance of said constriction and a fuel inlet passage to said chamber beyond said constriction, and ignition means beyond said inlet passage, said secondary vanes engaging said stator member at said ignition means whereby each successive pair defines a combustion chamber, the radial dimension of said chamber increasing in the direction of rotation at the zone of said ignition means, each secondary vane being adapted to leave the stator member after ignition and initial expansion of the charge acting thereagainst to merge said charge with previous charges to act against the primary vane for further expansion.

4. In an internal combustion engine, a casing member having a generally cylindrical interior wall and a member mounted eccentrically therein to define a chamber between said members, one of said members comprising a stator and the other a rotor, a primary vane and a multiplicity of secondary vanes carried by the rotor member and extending radially toward said stator member, said primary vane being yieldably urged in continuous sliding engagement with said stator member and said secondary vanes being yieldably urged radially toward a limit position wherein they slidably engage said stator member during a portion of their respective revolutions and are spaced therefrom during another portion, an exhaust passage leading from said chamber in advance of the point where the rotor is closet to said interior wall and a fuel inlet passage to said chamber beyond said point, and ignition means beyond said inlet passage, said secondary vanes engaging said stator member at said ignition means whereby each successive pair defines a combustion chamber, the radial dimension of said chamber increasing in the direction of rotation from said point through the zone of said ignition means and beyond, whereby the leading vane leaves the stator member after ignition and initial expansion of the charge acting thereagainst to merge said charge with previous charges to act against the primary vane for further expansion.

5. In an internal combustion engine, a casing having a generally cylindrical interior wall and a rotor mounted therein, to define a generally crescent shaped chamber between said members, a primary vane and a multiplicity of secondary vanes projecting radially from said rotor, said primary vane being in continuous sliding engagement with said interior wall and said secondary vanes being in slidable engagement with said interior wall during a portion of their respective revolutions and spaced therefrom during another portion, an exhaust passage leading from said chamber in advance of the narrowest part of said crescent shaped chamber and a fuel inlet passage to said chamber beyond said narrowest part, and ignition means beyond said inlet passage, said secondary vanes engaging said interior wall at said ignition means whereby each successive pair defines a closed combustion chamber, each of said secondary vanes being adapted to leave said interior wall after ignition and initial expansion of the charge acting thereagainst to merge said charge with previous charges to act against the primary vane for further expansion.

6. In an internal combustion engine, a casing member having a generally cylindrical interior wall and a member mounted therein to define a generally crescent shaped chamber between said members, one of said members comprising a stator and the other a rotor, a primary vane and a multiplicity of secondary vanes carried by the rotor member and extending radially toward said stator member, said primary vane being in continuous sliding engagement with said stator member and said secondary vanes being in slidable engagement with said stator member during a portion of their respective revolutions and spaced therefrom during another portion, an exhaust passage leading from said chamber in advance of the narrowest part of said crescent shaped chamber and a fuel inlet passage to said chamber beyond said narrowest part, and ignition means beyond said inlet passage, said secondary vanes engaging said stator member at said ignition means whereby each successive pair defines a closed combustion chamber, each of said secondary vanes being adapted to leave said stator member after ignition and initial expansion of the charge acting thereagainst to merge said charge with previous charges to act against the primary vane for further expansion.

7. In an internal combustion engine, a generally cylindrical casing and a rotor mounted eccentrically therein to define a generally annular chamber of varying width in a radial direction, a primary vane and a multiplicity of secondary vanes projecting radially from said rotor, said primary vane being yieldably urged in continuous sliding engagement with said casing and said secondary vanes being yieldably urged radially outwardly toward a limit position wherein they slidably engage said casing throughout a portion of said annular chamber and are spaced therefrom during another portion, said annular chamber having a portion of minimum radial extent, an exhaust passage leading from said chamber in advance of said minimum radial portion and a fuel intake passage leading to said chamber beyond said minimum portion, ignition means in said chamber beyond said intake passage, said secondary vanes engaging said casing at said ignition means to define a succession of combustion chambers, said annular chamber increasing in width from said minimum radial portion to a point substantially beyond said ignition means whereby the leading secondary vane of each combustion chamber presents a greater area than the trailing vane thereof at said ignition means and whereby said leading vane leaves said casing beyond said combustion chamber after ignition and initial expansion of the charge in said combustion chamber to merge said charge with previous charges acting against the primary vane for further expansion.

8. In an internal combustion engine, a generally cylindrical casing member and a member mounted eccentrically therein to define a generally annular chamber of varying width in a radial direction, one of said members comprising a stator and the other a rotor, a primary vane and a multiplicity of secondary vanes carried by said rotor member and extending radially toward said stator member, said primary vane being yieldably urged in continuous sliding engagement with said stator member and said secondary vanes being yieldably urged radially toward a limit position wherein they slidably engage said stator member throughout a portion of said annular chamber and are spaced therefrom during another portion, said annular chamber having a portion of minimum radial extent, an exhaust passage leading from said chamber in advance of said minimum radial portion and a fuel intake passage leading to said chamber beyond said minimum portion, ignition means in said chamber beyond said intake passage, said secondary vanes engaging said stator member at said ignition means to define a succession of combustion chambers, said annular chamber increasing in width from said minimum radial portion to a point substantially beyond said ignition means whereby the leading secondary vane of each combustion chamber presents a greater area than the trailing vane thereof at said ignition means and whereby said leading vane leaves said casing beyond said combustion chamber after ignition and initial expansion of the charge in said combustion chamber to merge said charge with previous charges acting against the primary vane for further expansion.

9. In an internal combustion engine, a casing having a generally cylindrical interior wall and a rotor mounted therein to define a generally annular chamber between said members, a primary vane and a multiplicity of secondary vanes projecting radially from said rotor, said primary vane being in continuous sliding engagement with said interior wall and said secondary vanes being in slidable engagement with said interior wall during a portion of their respective revolutions and spaced therefrom during another portion, said interior wall being shaped to form a constriction in said generally annular chamber, an exhaust passage leading from said chamber in advance of said constriction and a fuel inlet passage to said chamber beyond said constriction, and ignition means beyond said inlet passage, said secondary vanes engaging said interior wall at said ignition means whereby each successive pair defines a combustion chamber, the radial distance between the rotor and said interior wall gradually increasing in the direction of rotation at the zone of said ignition means, each secondary vane being adapted to leave said interior wall after ignition and initial expansion of the charge to merge said charge with previous charges to act against the primary vane for further expansion, and means for supplying a compressed gaseous fuel to said inlet passage.

10. In an internal combustion engine, a casing member having a generally cylindrical interior wall and a member mounted therein to define a generally annular chamber between said members, one of said members comprising a stator and the other a rotor, a primary vane and a multiplicity of secondary vanes carried by the rotor member and extending radially toward said stator member, said primary vane being in continuous sliding engagement with said stator member and said secondary vanes being in slidable engagement with said stator member during a portion of their respective revolutions and spaced therefrom during another portion, said annular chamber having a constriction therein, an exhaust passage leading from said chamber in advance of said constriction and a fuel inlet passage to said chamber beyond said constriction, and ignition means beyond said inlet passage, said secondary vanes engaging said stator member at said ignition means whereby each successive pair defines a combustion chamber, the radial dimension of said chamber increasing in the direction of rotation at the zone of said ignition means, each secondary vane being adapted to leave the stator member after ignition and initial expansion of the charge acting thereagainst to merge said charge with previous charges to act against the primary vane for further expansion, and means for supplying a compressed gaseous fuel to said inlet passage.

References Cited in the file of this patent

FOREIGN PATENTS 567,249     France _____ Dec. 4, 1923